United States Patent [19]
Tian et al.

[11] Patent Number: 5,545,989
[45] Date of Patent: Aug. 13, 1996

[54] NON-DESTRUCTIVE IN-SITU LANDING VELOCITY DETERMINATION OF MAGNETIC RIGID DISK DRIVES USING BACK EMF FROM THE SPINDLE MOTOR DURING SHUTDOWN

[75] Inventors: Hong Tian, Milpitas, Calif.; Christopher H. W. Briggs, Colorado Springs, Colo.; Chisin Chiang, Santa Clara; Jia-Kuen J. Lee, San Jose, both of Calif.

[73] Assignee: Conner Peripherals, Inc., San Jose, Calif.

[21] Appl. No.: 375,087

[22] Filed: Jan. 19, 1995

[51] Int. Cl.$^6$ .......................... G01R 33/12; G11B 15/64
[52] U.S. Cl. .............................. 324/212; 360/103
[58] Field of Search .................... 324/210, 212; 360/102, 103, 75, 73.03

[56] References Cited

U.S. PATENT DOCUMENTS

| | | | |
|---|---|---|---|
| 4,777,544 | 10/1988 | Brown et al. | 360/75 |
| 4,864,437 | 9/1989 | Couse et al. | 360/75 |
| 4,918,556 | 4/1990 | Ezaki et al. | 360/97.02 |
| 5,130,866 | 7/1992 | Klaassen et al. | 360/75 |

*Primary Examiner*—Walter E. Snow
*Assistant Examiner*—Roger Phillips
*Attorney, Agent, or Firm*—Flehr, Hohbach, Test, Albritton & Herbert

[57] ABSTRACT

A method is described for testing for slider/disk contact in a disk drive comprising a rotating disk and a head mounted by an actuator for selective positioning of the head over the disk, the head having a slider, and a spindle motor for rotating the disk. The method comprises the steps of providing power to the spindle motor to cause rotation of the disk at a preselected rotational velocity corresponding to a rotational velocity designed for the disk during normal read/write operation, and thereafter withdrawing the power from the spindle motor such that the disk spins down to zero rotational velocity. While the disk spins down to zero rotational velocity, an acoustic coupling is formed between an acoustic emission sensor having an electric output and the spindle motor to provide first electric signals representative of acoustic emissions from the spindle motor, including acoustic emissions caused by slider/disk contact. While the disk spins down to zero rotational velocity, an electric probe is coupled to the spindle motor to provide second electric signals representative of back EMF generated by the spindle motor as the disk spins down to zero velocity. The first electric signals are monitored for a first indication of slider/disk contact, and the second signals are utilized at the time of the first indication of slider/disk contact from the first electric signals, to calculate the rotational velocity of the disk at the time of the first indication of slider/disk contact. The calculated rotational velocity is compared to a threshold value relevant to a desired take-off or landing velocity for the head of the disk drive, and an indication is made when the calculated rotational velocity exceeds the threshold value.

12 Claims, 6 Drawing Sheets

NON-DESTRUCTIVE IN-SITU LANDING VELOCITY DETERMINATION OF MAGNETIC RIGID DISK DRIVES USING BACK EMF FROM THE SPINDLE MOTOR DURING SHUTDOWN

FIELD OF THE INVENTION

The present invention is directed to disk drives. More particularly, the present invention provides an efficient and reliable system and method for detecting a worst case landing velocity for sliders in the disk drive.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface.

A head includes an interactive element, such as a magnetic transducer, that is used to sense the magnetic transitions to read data, or to conduct an electric current that causes a magnetic transition on the disk surface, to write data. The magnetic transducer includes a read/write gap that positions the active elements of the transducer at a position suitable for interaction with the magnetic surface of the disk.

The head further comprises a slider that mounts the transducer to a rotary actuator arm, typically via a flexure element arranged between the slider and actuator arm to accommodate movement of the head during operation of the drive. The actuator arm operates to selectively position the head, including the transducer and slider, over a preselected data track of the disk to either read data from or write data to the preselected data track of the disk, as the disk rotates below the transducer.

In modern disk drives, the slider is configured to include an air bearing surface that causes the head, and thus the transducer, to fly above the data tracks of the disk surface due to interaction between the air bearing surface of the slider and fluid currents that result from the rotation of the disk. The amount of distance that the transducer flies above the disk surface is referred to as the "fly height." As should be understood, due to operation of the air bearing surface, the transducer does not physically contact the disk surface during normal read and write operation of the disk drive to minimize wear during operation of the drive.

The fly height for a slider refers to the height reached by the slider when the disk is rotating at its operational rotational velocity, i.e. the number of rotations per minute (rpm's) at which the disk drive was designed to operate. The fly height is designed to be at a level sufficient to insure that the transducer is spaced from the disk surface a distance suitable to maintain negligible contact between the head and disk surface during normal disk operation. In any disk drive product, the surfaces of the disks are typically not perfectly smooth and flat. There are peaks and valleys formed on the disk surface. The design fly height should be sufficient, e.g. to generally avoid head/disk contact, despite the passage of disk surface peaks below the head. When the disk drive is not operating, the rotation of the storage disk is stopped, and the air bearing surface of the head does not act to cause the transducer to fly. Under such circumstances, the head, including the slider and transducer, comes to rest on the disk surface. Typically, the actuator is operated prior to power down of the disk drive, to position the head over a landing zone provided on the disk surface at a location spaced away from any of the data tracks.

In a known contact stop operation of a disk drive, at power down of the drive, the fly height of the head gradually decreases as the rotational velocity slows, until the head comes into contact with the disk surface at the landing zone. The rotational velocity of the disk at which a head first contacts a disk surface is referred to as the "landing" velocity. Thereafter, the head remains in contact with the disk surface until and after rotation of the disk comes to a complete stop. The use of a landing zone prevents any damage to data tracks that may occur due to contact between the head and the disk surface. However, any contact between the head and the disk surface may result in damage to the transducer, and, in any event, contributes to wear of the head and disk surface.

This is also true when the disk drive is started again in a contact start operation. A contact start operation causes the commencement of rotation of the disk while the head is still in contact with the landing zone. The head remains in contact with the disk surface during acceleration of the disk, until the rotational velocity of the disk reaches a "take-off" velocity. The take-off velocity is the rotational velocity of the disk at which the air bearing surface first acts to lift the head from the disk surface such that contact between the slider and the disk surface is negligible. The take-off velocity is approximately equal to the landing velocity.

It is a goal of disk drive manufacturers to limit wear caused by contact between the head and disk surface, particularly during contact stop and start operations, to assure a more reliable mechanical performance of the disk drive. To that end, disk drive designs seek to accomplish disk drive operation wherein a head commences flying operation within an acceptable margin of rotational velocity measured from the operational rotational velocity for the disk.

For example, it has been determined that mechanical performance for a particular drive is likely to be acceptable for a relatively long work life when the head lifts off from or lands on the disk surface at a rotational velocity equal to approximately seventy per cent of the operational rotational velocity of the drive. In general, the fly height of a head is proportional to the rotational velocity of the disk, once the take-off velocity has been reached. In other words, the faster the disk is spinning, the higher the fly height of the head. It has been found that if flying operation (the take-off velocity) for a head is achieved by, e.g., seventy per cent of the operational velocity, the desired fly height should be reached by the head when the disk is accelerated up to the operational velocity. If the take-off velocity is greater than seventy per cent of the operational velocity, there is a significant likelihood that the head does not reach the desired fly height when the disk is accelerated to the operational velocity, leading to excessive wear and premature mechanical failure of the disk drive.

In addition, when the take-off or landing velocity is greater than seventy per cent of the operational velocity, the head remains in contact with the disk surface (i.e. the total sliding distance of the head on the disk surface during either a contact start or stop operation) for a total length of disk surface that is likely to result in excessive wear of the head/disk interface.

During manufacture of disk drives, it is desirable to be able to test each individual disk drive to determine the take-off and/or landing velocity for each head in the drive as a quality control procedure to insure that each head in the disk drive is operating to lift off from or land on the disk surface with a minimal sliding distance, and, in a contact start operation, is operating to reach the design fly height at the operational rotational velocity of the disk. However, there is not presently available a reliable and efficient system or method to determine take-off velocity values on a drive-by-drive basis, particularly for disk drives having multiple disks and heads.

Previous proposals involve recording a signal having a known frequency on a preselected track of the disk while the disk is rotating at a preselected rotational velocity and then reading back the signal at one or more different rotational velocities of the disk, including a rotational velocity corresponding to an expected take-off velocity. Contact between the slider and disk surface affects the signal read back from the disk. Knowledge of how the read back signal is affected can be applied to analyze the signal for evidence of slider/disk contact. The analysis can include frequency or amplitude demodulation of the read back signal for indications of slider/disk contact, and, measurement of the rotational velocity at which the read back signal first indicates slider/disk contact. Such a velocity measurement will generally correspond to the take-off velocity of the particular slider.

The methods and apparatuses described in the previous proposals suffer from shortcomings such as limited bandwidth for effective demodulation of the read back signal, time consuming procedures for detecting the read back signal and poor signal-to-noise ratios diminishing the accuracy and sensitivity of the detection process. In addition, the prior proposals are not sufficiently economical for implementation in a mass production operation to quickly and efficiently test each and every disk drive product being manufactured.

SUMMARY OF THE INVENTION

The present invention provides a system and method for accurately and efficiently detecting a worst case landing velocity for the heads in a disk drive product during manufacture of the product. The worst case landing velocity corresponds to the landing velocity of the first head to contact a disk surface in a controlled power down of the disk drive product.

The present invention recognizes that one of the effects of slider/disk contact is an acoustic emission from mechanical components of the disk drive, such as, e.g., the spindle motor. According to the present invention, the acoustic emissions caused by slider/disk contact are sensed by an acoustic emission sensor and the sensed acoustic emissions are correlated to the rotational velocity of the disks of the disk drive product at the time the acoustic emissions indicative of slider/disk contact are first sensed, to provide landing velocity information.

In an exemplary embodiment of the present invention, an acoustic emission sensor is securely acoustically coupled to the spindle motor of a disk drive device under test. The acoustic sensor receives acoustic emissions from the spindle motor and operates to transduce the acoustic emissions into corresponding electric signals. The acoustic emissions emanating from the spindle motor include emissions caused by vibrations of the motor itself, as well as emissions caused by mechanical vibrations that result from contact between any one of the heads in the disk drive device under test and the respective disk surface (slider/disk contact). Accordingly, the acoustic emission sensor outputs electric signals indicative of the occurrence of any slider/disk contact within the device under test.

Pursuant to the present invention, the spindle motor is initially powered to accelerate the disks up to the operational velocity designed for the device under test. Thereafter, the power to the spindle motor is shut off, and the disks are allowed to spin down to zero velocity.

Pursuant to another feature of the present invention, an electric probe is coupled to electric leads used to power the spindle motor. After the power to the spindle motor is shut off, the probe attached to the spindle motor power leads is used to measure a back EMF generated by the continuing rotation of the spindle motor. A back EMF is an electric voltage generated by the rotation of components of a conventional electric motor, such as the rotor, and typically pulsates at a frequency that is proportional to the rotational velocity of the rotating components. Inasmuch as the rotor is typically used to directly rotate the disks of a disk drive, the spindle motor rotor rotational velocity, as represented by the generated pulsating back EMF, is indicative of the rotational velocity of the disks at any time during the spin down of the disks after shut down of the power to the spindle motor.

The output of the probe is continuously processed during spin down to correlate the back EMF values to corresponding rotational velocities of the disks of the device under test. At the same time, the output of the acoustic emission sensor is monitored to determine when an indication of slider/disk contact first occurs. Upon determination of a first indication of slider/disk contact from the electric signal output of the acoustic emission sensor, the rotational velocity of the disk, as indicated by the back EMF value from the probe at the time of the first slider/disk contact, is recorded.

The recorded rotational velocity corresponds to the landing velocity of at least the first one of the heads in the device under test to contact a disk surface. The recorded velocity is compared to a threshold velocity, which can be set at, e.g., seventy per cent of the operational velocity designed for the device under test. If the recorded velocity, as determined from the back EMF reading from the probe, is equal to or less than the threshold value, then all of the heads of the device under test are operating at acceptable levels of fly height. This is because the test according to the present invention established a first indication of contact between any of the heads of the device under test and a respective disk surface, at a value of rotational velocity at or less than seventy per cent of the operational velocity of the disk drive. Inasmuch as the disks of the device under test are spinning down to zero velocity, any subsequent slider/disk contacts will occur at even lower rotational velocities.

As noted above, the landing velocity for a head is generally equal to the take-off velocity for the head. Thus, the use of the landing velocity method according to the present invention provides an indication of take-off velocity performance for the heads of a disk drive device under test. If the comparison between the recorded rotational velocity and the threshold value indicates that the recorded velocity is greater than the threshold value, then it will be known that at least one of the heads of the device under test is not achieving fly height operation according to the design specification of the disk drive.

The landing velocity information provided by the present invention can be used during a disk drive mass manufacturing operation to screen those disk drive products wherein at least one of the heads comes into contact with a respective disk surface at a landing velocity greater than, seventy per cent of the rotational velocity at which the disk drive product was designed to operate. Any disk drive product that fails to evidence an acceptable landing velocity for all of its heads is rejected and removed from the mass production operation for further testing and repair.

The acoustic emission, back EMF probe arrangement of the present invention provides a straightforward, highly efficient and economical mechanism able to be implemented in a mass production environment to quickly test each and every disk drive product passing through the manufacturing process, for acceptable fly height operation. To advantage, any disk drive product that fails to evidence an acceptable landing velocity upon acoustic emission testing, can be subjected to a frequency demodulation test to determine the take-off or landing velocity for each individual head in the failed disk drive, to thereby identify which individual head or heads need to be repaired. The frequency demodulation test can be performed according to the test method taught in U.S. application Ser. No. 08/374,052 entitled FM DETECTION OF SLIDER-DISK INTERFACE, filed on even date herewith in the name of Li-Yan Zhu and assigned to the assignee of the present-application. The specification of the aforementioned co-pending application is hereby expressly incorporated by reference.

DETAILED DESCRIPTION

Figure 1:
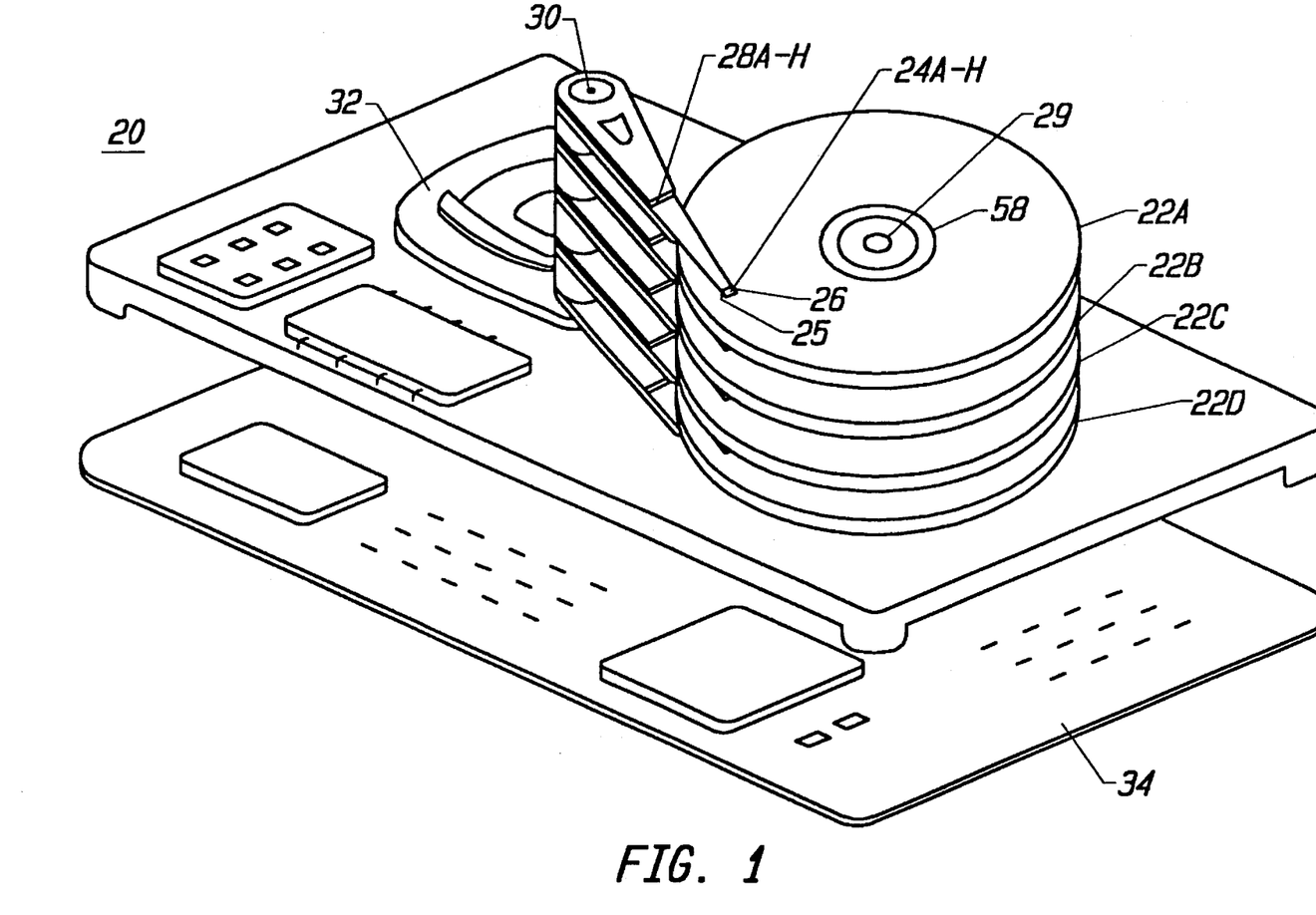
FIG. 1 is perspective view of an exemplary disk drive.

Referring now to the drawings, and initially to FIG. 1, there is illustrated an example of a disk drive designated generally by the reference numeral 20. The disk drive 20 includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented for use in connection with a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58, where the read/write heads 24a–h come to rest on the storage disk surfaces. As should be understood, each of the read/write heads 24a–h is at rest on a respective landing zone 58 at the commencement of a contact start operation.

A printed circuit board (PCB) 34 is provided to mount control electronics for controlled operation of the spindle motor 29 and the voice coil motor 32. The PCB 34 also incudes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
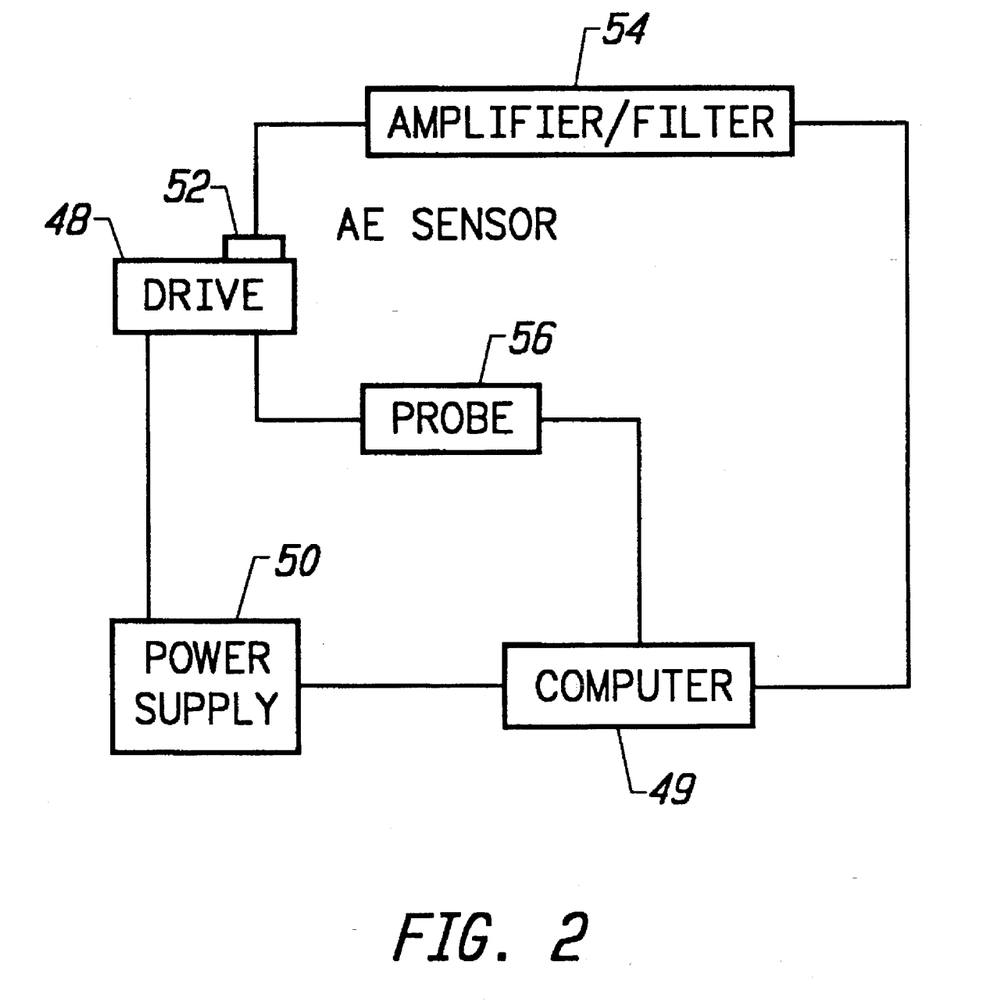
FIG. 2 is a block diagram of a test system according to the present invention to determine a worst case landing velocity for heads in a disk drive device under test.

According to an exemplary non-destructive, in-situ, acoustic emission landing velocity test method implementing the present invention, prior to assembly and coupling of the PCB 34, an assembly 48 comprising the actuator arms 28a–h, with heads 24a–h, voice coil motor 32, storage disks 22a–d and spindle motor 29 of FIG. 1, is coupled to a test system as a device under test, as illustrated in FIG. 2. More particularly, a power supply 50 is coupled to the spindle motor 29 within the assembly 48, as generally known, to accelerate the storage disks 22a–d up to the operational velocity designed for the assembly 48. The power supply 50 is controlled by a computer 49 that is programmed to operate the power supply 50 to energize the spindle motor 29 until the storage disks 22a–d rotate at the operational velocity designed for the disks 22a–d of the assembly 48. The assembly 48 is operated with the heads over the landing zone 58.

An acoustic emission sensor 52, such as, e.g., an R15 sensor sold by Acoustic Physics, is placed upon the assembly 48 on the top cover of a motor hub (not shown) typically formed in a disk drive product to mount the spindle motor 29. A small amount of alcohol can be applied to the contacting surface of the assembly before placing the acoustic emission sensor 52 on the assembly 48 to provide a clean contact surface for transmission of acoustic waves. A dead weight (not shown) placed on top of the acoustic emission sensor 52 can be used to provide an adequate acoustic coupling between the sensor 52 and spindle motor 29. The alcohol will evaporate when the sensor 52 is removed from the assembly, after the test, to minimize contaminants that may be introduced into the disk drive. The use of alcohol and a dead weight provides a fast and clean means for acoustically coupling the sensor 52 to the spindle motor 29, to thereby facilitate a high throughput rate for the test method of the present invention. The R15 acoustic sensor 52 operates to transduce acoustic emissions sensed by the sensor 52 into an electric signal.

An electric output of the sensor 52 is coupled to an amplifier, filter circuit 54 to amplify the electric output of the sensor 52 and to tune the amplified signal to between approximately 150 and 350 kHz. The amplified and tuned signal output by the amplifier circuit 54 is coupled to an analog input port of the computer 49, for monitoring by the computer 49 to determine indications of slider/disk contact, as will be described in more detail below.

An electric probe 56 is coupled as a differential probe across two power wires of the spindle motor 29 to measure a back EMF voltage generated by the spindle motor 29, as is generally known in the art. Pursuant to the exemplary embodiment of the present invention, the output of the probe 56 is also coupled to an analog input port of the computer 49, for monitoring by the computer 49 to determine a corresponding rotational velocity of the storage disks 22a–d mounted by the spindle motor 29 within the assembly 48 being tested, as will appear.

Figure 3:
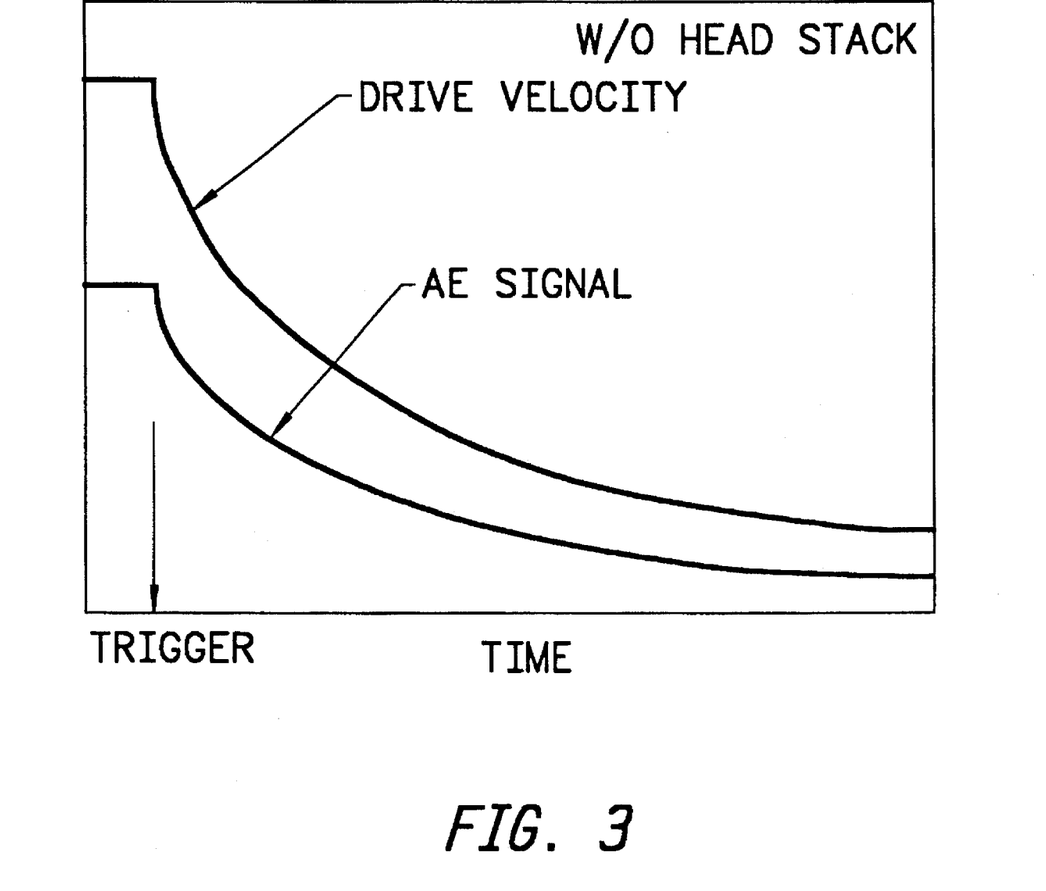
FIG. 3 is a graph illustrating the relationship between an acoustic emission signal and drive velocity of a disk, over time.

Referring now to FIG. 3, there is shown a graph illustrating the relationship between an acoustic emission signal derived from the sensor 52 and rotational velocity of disks, such as the storage disks 22a–d in assembly 48, as can be determined from the electric output of the probe 56, over time. In FIG. 3, the relationship is plotted without the influence of acoustic emissions that are caused by slider/disk contact.

Back EMF voltage values for the type of spindle motor used in the assembly 48 can be correlated to the corresponding rotational velocities of the motor rotor. The computer 49 operates to periodically sample the back EMF voltage from the probe 56. The back EMF pulsates at a frequency related to the rotational velocity of the motor rotor. The computer 49 can calculate the rotational velocities of the motor rotor by timing the back EMF pulses sampled by the computer 49. As should be understood, the rotational velocity of the motor rotor is proportional to the rotational velocity of the storage disks 22a–d mounted by the spindle motor 29.

The computer 49 also operates to periodically sample the electric output of the amplifier circuit 54 to obtain signal values corresponding to acoustic emissions received by the sensor 52 from the spindle motor 29 within the assembly 48 under test.

As shown in FIG. 3, at times prior to the time labeled "trigger", the spindle motor 29 is fully energized by the power supply 50, and the storage disks within the assembly 48 are rotating at the design operational rotational velocity. The rotational velocity value (curved labeled "drive velocity") remains at a level corresponding to a maximum value, which, in turn, corresponds to the operational velocity.

At the time labeled "trigger", the computer 49 controls the power supply 50 to withdraw power from the spindle motor 29 so as to permit the storage disks 22a–d to spin down to zero velocity. The computer also operates to begin sampling back EMF values from the probe 52. As can be seen in FIG. 3, the velocity values represented by the drive velocity curve to the right of the trigger point gradually decrease in proportion to the slow down of the rotational velocity of the storage disks 22a–d.

Below the drive velocity curve of FIG. 3 is a curve corresponding to the electric output from the acoustic emission sensor 52 that results from acoustic emissions caused by the rotation of the spindle motor 29 (curve labeled "AE signal"). As seen in FIG. 3, the shape and slope of the AE signal curve generally conform to the shape and slope of the drive velocity curve, indicating that acoustic emissions from noise caused by the spindle motor 29 are proportional to the rotational velocity of the storage disks 22a–d mounted by the spindle motor in the assembly 48. Thus, after the trigger point, the acoustic emissions from the spindle motor decrease in proportion to the slow down in rotational velocity of the storage disks 22a–d during spin down.

Figure 4:
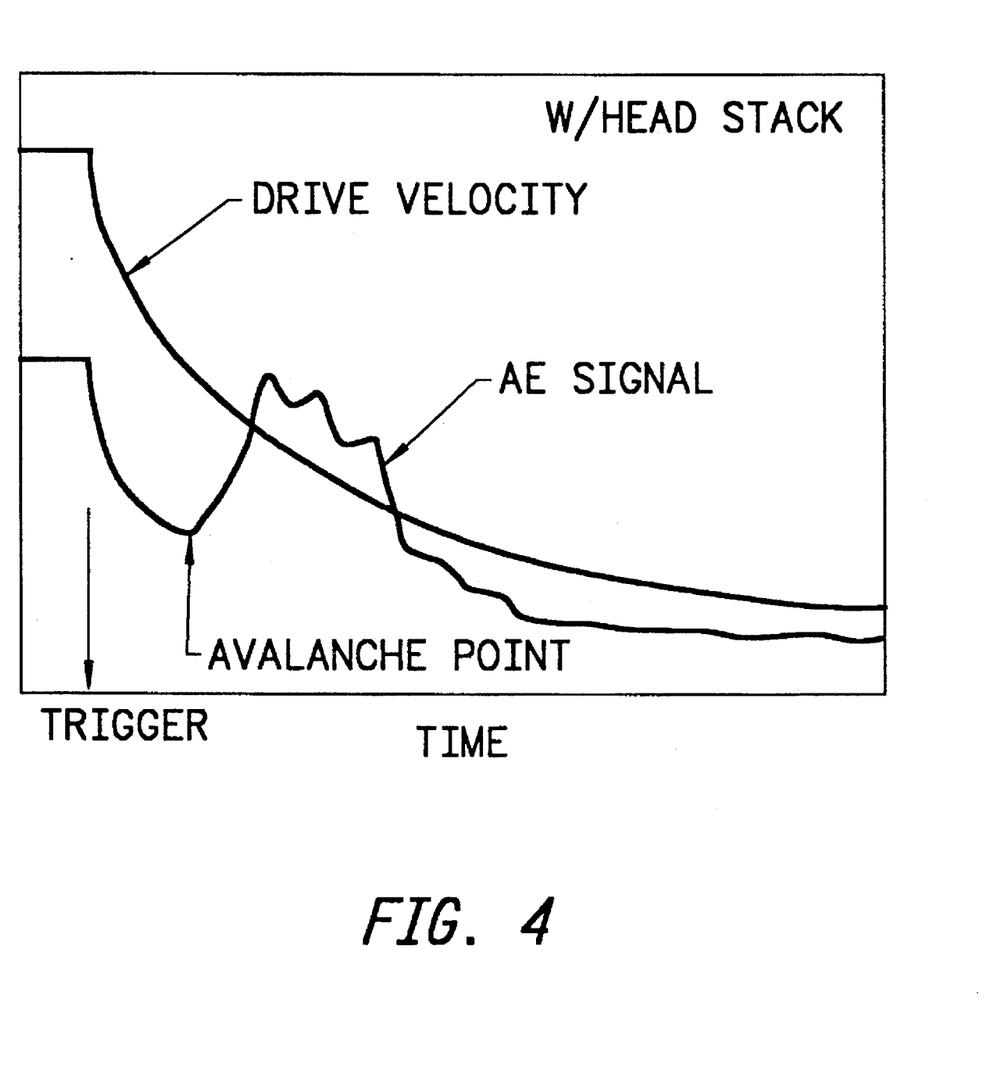
FIG. 4 is a graph illustrating the relationship between an acoustic emission signal and drive velocity of a disk, over time, including the effects of acoustic emission signals caused by slider/disk contact.

Referring now to FIG. 4, there is shown a graph illustrating the relationship between the acoustic emission signal derived from the sensor 52 and rotational velocity of the storage disks 22a–d, including acoustic emissions caused by slider/disk contacts within the assembly 48, as recognized by the present invention. From the trigger point, the graph of FIG. 4 is similar to the graph of FIG. 3 until a first head within the assembly 48 contacts a respective disk surface. That point is labeled "avalanche point" on FIG. 4. As discovered, the acoustic emissions from the spindle motor 29 change dramatically upon an initial slider/disk contact. Thus, the electric signal output by the sensor 52, as illustrated in the example of FIG. 4, increases sharply and suddenly upon the initial contact, as shown at the avalanche point in the graph of FIG. 4.

According to the present invention, the computer 49 is operated to sample both the electric output of the sensor 52 and the back EMF voltage derived from the probe 56 after the trigger point. Moreover, the computer 49 is programmed to calculate and record the drive velocity value, as represented by pulses from the back EMF voltage, when the computer detects the sudden change in AE signal strength (avalanche point), indicative of a first slider/disk contact. The drive velocity at the avalanche point corresponds to the landing velocity of the first head within the assembly 48 to contact a disk surface.

After recording the landing velocity value for the assembly under test, the computer 49 operates to compare the recorded landing velocity to a threshold landing velocity value stored in the computer 49, and to indicate a "rejection" of any assembly under test wherein the recorded rotational velocity at the avalanche point is greater than the threshold value.

The threshold landing velocity can be set as a function of the following formula:

$$LV_{threshold} = ((TOH + \Delta FH) * \text{Full Speed}) / (FH_{min} * S)$$

wherein:

$LV_{threshold}$ is the threshold value for a landing velocity against which velocity at the avalanche point in a device under test is compared;

TOH is the specification for the disks used in the device under test and indicates the flying height avalanche point of the disk surface;

Full Speed is the operational rotational velocity for the device under test;

$FH_{min}$ is the minimum flying height as per the design specification of the device under test;

$\Delta FH$ is the fly height drop due to clamping of the disk to the spindle motor; and S is a safety factor selected by a system designer.

Figure 5:
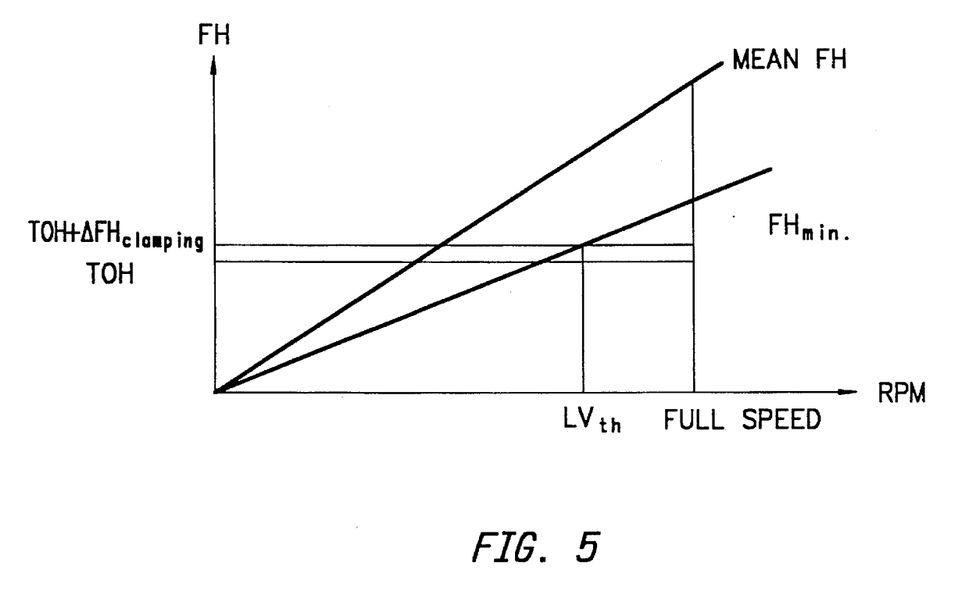
FIG. 5 is a graph illustrating fly height for a head versus rotational velocity of a disk over which the head is flying.

FIG. 5 illustrates the relationship between flying height and the rotational velocity of a disk. The graph of FIG. 5 shows the slope of the change in flying height versus the rotational velocity of the disk. The upper sloped line is the mean value for flying height change as a function of rotational velocity. The lower sloped line is a minimum slope that would be expected in the device under test. As illustrated, when $LV_{threshold}$ is calculated by the above formula, the minimum slope for the flying height change is sufficient to raise the flying height to the design $FH_{min}$. Any head in a device under test having a rotational velocity at the avalanche point that is greater than $LV_{threshold}$ would not reach the $FH_{min}$ when a minimum slope is encountered, and the respective head would more likely encounter wear problems if such a device under test were not removed form the manufacturing operation for repair.

As noted above, the acoustic emission test according to the present invention determines the worst case landing velocity for the device under test, but does not indicate which actual head or heads of a failed device do not achieve acceptable fly height operation. To determine the take-off velocity of each individual one of the heads 24a–h of an assembly 48 that fails the acoustic emission test, the failed assembly can be subject to the test method disclosed in co-pending U.S. application Ser. No. 08/374,052 entitled FM DETECTION OF SLIDER-DISK INTERFACE, as noted above.

Figure 6:
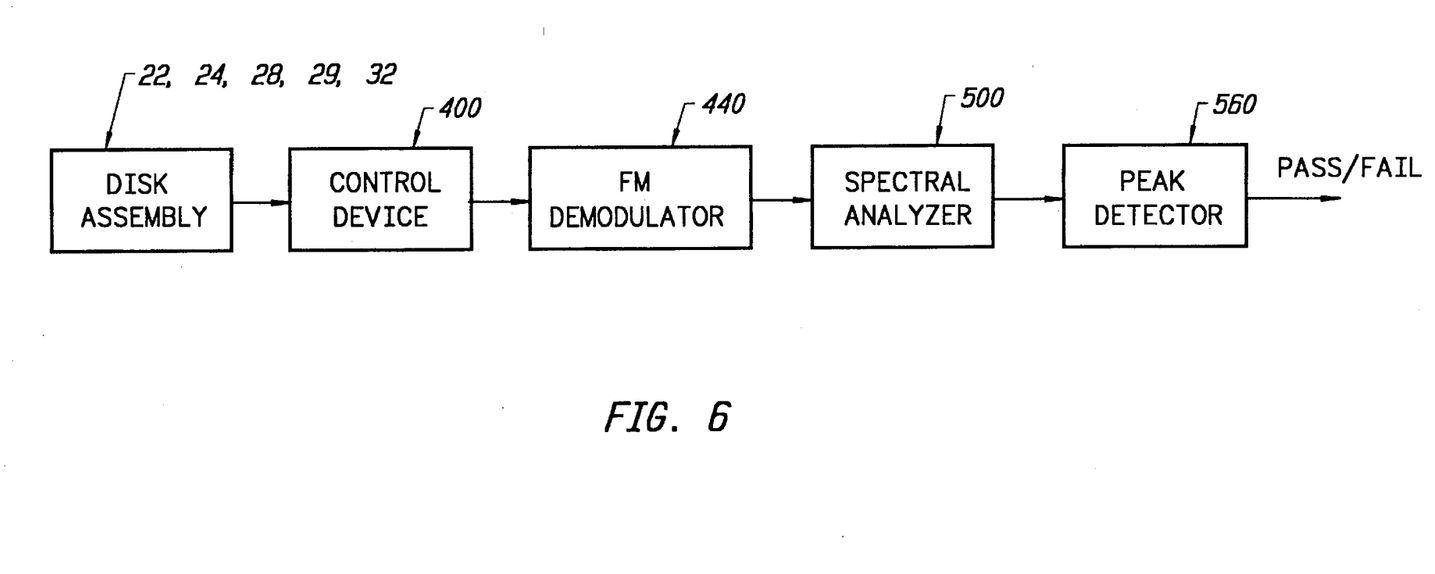
FIG. 6 is a block diagram for a frequency demodulation test that can be used in conjunction with the test system of FIG. 2 to identify individual heads that contact a disk surface at a landing velocity that is not within the design specification of the disk drive device under test, as determined by the test system of FIG. 2.

FIG. 6 illustrates in block diagram form a test system according to the invention of the co-pending application. A control device 400 simulates the PCB 34 to operate the assembly under test. More particularly, the control device 400 is coupled to the assembly in place of the PCB 34 to control operation of the spindle motor 29 and voice coil motor 32, and includes read/write channel circuitry to cause the heads 24a–h to read or write signals from or to the surfaces of the storage disks 22a–d.

As generally known in the art, the control device 400 is provided with a multiplexer (not shown) to select any one of the heads 24a–h at a time for control to either read or write signals from or to the respective disk surface.

The control device 400 includes an output coupled to an input of an FM demodulator 440. The control device output operates to transmit signals read by a selected one of the read/write heads 24a–h to the FM demodulator 440. The FM demodulator 440 can comprise a conventional FM demodulator, as commonly used in FM radios, modified to receive a frequency bandwidth appropriate to disk drive jitter frequencies, or a laboratory instrument, such as, e.g., an HP 8901A Modulation Analyzer. The FM demodulator 440 includes an output to output signals of various frequencies demodulated from the signal read back by a selected head 24a–h.

A spectrum analyzer 500 includes an input coupled to the output of the FM demodulator 440 to receive the demodulated frequency signals. The spectrum analyzer 500 operates to provide signal strength information for each of the frequencies demodulated by the FM demodulator 440. The spectrum analyzer can comprise a conventional frequency spectrum analyzer or a processor performing a Fourier transformation of the received demodulated frequency signals. For most efficient operation, a fast Fourier transformation algorithm is implemented in the processor, as will be described in more detail below.

An output of the spectrum analyzer 500 is coupled to a peak detector 560 arranged to detect peak values that are above a threshold envelope encompassing a value or values of signal strength indicative of head/disk contact, from the signal strength information generated by the spectrum analyzer 500. The peak detector 560 operates to output a pass/fail indication for the device under test, based upon detection of peaks above any value encompassed within the threshold envelope, as will appear. Any peak value above a threshold value indicates slider/disk contact.

The control device 400 is operated to cause the voice coil motor 32 to position the actuator arms 28a–h over a preselected radius of the storage disks 22a–d. The particular radius chosen depends on the sensitivity of frequency of a read back signal due to head/disk contact.

The sensitivity of frequency of a read back signal is affected by several factors most notably, the magnitude and direction of mechanical vibrations caused by the contact. These factors vary as a function of the particular structures and construction of the mechanical components comprising the head, flexure and other suspension elements mounting the head to an actuator arm.

Initially, the sensitivity of read back frequency to head/disk contact can be determined experimentally for a particular head. For certain presently used sliders and suspensions, such as a two-rail nano slider and type 19 suspensions manufactured by Hutchinson, it has been found that the sensitivity is greatest when the skew angle between a head and disk is greatest. In most rotary actuators of the type illustrated in FIG. 1, the greatest skew angle occurs when the actuator arms 28a–h position the heads 24a–h at the outer rim of the storage disks 22a–d.

Once a radius is selected and the control device 400 operates to cause the voice coil motor 32 to position the actuator arms 28a–h at the preselected radius of the respective storage disks 22a–d, the control device 400 controls the spindle motor 29 to rotate the storage disks 22a–d at a first preselected rotational velocity. While rotating at the first rotational velocity, the control device 400 utilizes the multiplexer to sequentially activate each of the heads 24a–h, to write, in turn, a signal having a substantially uniform pattern completely around each respective storage disk surface, at the preselected radius. The wavelength of each pattern signal as written on the respective disk surface, will be a function of the frequency of the signal provided to the head 24 by the control device 400 and the first preselected rotational velocity. The written signal will include frequency jitter if the respective activated head 24a–h is in contact with the disk surface during writing of the pattern signal. To advantage, the wavelength of the written signal is set to equal the wavelength of the high frequency signal typically used to test the magnetic performance of the heads 24a–h.

When writing the signal to each disk surface, there will typically be a discontinuity in the signal at the completion of the rotation of the disk. This is due to the fact that the wavelength of the signal does not precisely fit a whole number of cycles within the circumference of the storage disk at the preselected radius. The spectrum analyzer 500 is gated to omit reception of the signal form the head when it is passing over the discontinuity of the signal written on the respective disk surface, as will be described in greater detail below.

After the writing of each signal having a substantially uniform pattern completely around each respective storage disk surface, at the preselected radius, and with the actuator arms 28a–h remaining at the preselected radius of the respective storage disks 22a–d, the control device 400 then controls the spindle motor 29 to rotate the storage disks 22a–d at a second preselected rotational velocity. While rotating at the second rotational velocity, the control device 400 utilizes the multiplexer to sequentially activate each of the heads 24a–h, to read the previously written signals, one at a time. The frequency of each pattern signal as read from the disk surface, will now be a function of the second preselected rotational velocity and will include frequency jitter if the respective activated head 24a–h was in contact with the disk surface during either reading or writing of the pattern signal.

Each of the first and second rotational velocities is chosen to be at a value relevant to the take-off velocity for the heads 24a–h. For example, if the disk drive 20 is designed to operate at 7200 rpm, the signal can be written at a first rotational velocity equal to 7200 rpm. The signal can then be read back at a rotational velocity equal to approximately 70% of 7200 rpm, e.g. 5000 rpm. The method can be implemented in an opposite order of writing and reading a signal, i.e., writing the signal at 5000 rpm and reading the signal back at 7200 rpm.

In any event, the two rotational velocities selected should provide information regarding slider/disk contact at a minimum take off velocity acceptable for the device under test. One of the rotational velocities selected should be at the desired take off velocity, and the other sufficiently higher, e.g. 10% higher (5000 rpm higher in the example of a take off velocity of 5000 rpm), to eliminate any repeatable vibrations that may occur in the head at approximately equal rotational velocities. In this manner, any frequency jitter found in the read back signal will be indicative of a failure to achieve fly height operation by the desired take off velocity, as will appear.

The signals read back by the heads 24a–h are transmitted by the output of the control device 400 to the input of the FM demodulator 440. The FM demodulator 440 is may include filters to attenuate frequency jitter unrelated to slider/disk contact. The FM demodulator 440 is operated to demodulate the read back signals, one at a time, from the heads 24a–h. The spectrum analyzer 500 is gated at the portion of the signal that contains a discontinuity to omit the influence of the discontinuity in the signal demodulation. The length of the discontinuity is short as compared to frequency jitter effects that may be caused by slider/disk contact. Accordingly, even if slider/disk first occurs at the discontinuity, the effects of jitter will persist beyond the length of the discontinuity, and will be detected by the FM demodulation.

Vibrations of the head/actuator assembly occur in various modes, including flexure modes and suspension modes. The frequency range of the FM demodulation focuses upon vibrations in the flexure mode. It has been determined that flexure vibrations are less susceptible to noise, and more indicative of slider/disk contact. Other forms of vibration, e.g. suspension vibrations, can be caused by factors other than slider/disk contact, such as air turbulence and spindle vibrations. In addition, flexure vibrations occur at a higher frequency than suspension vibrations resulting in higher FM resolution of amplitude information.

Experimentation has shown that flexure modes of vibration are quiet in the absence of slider/disk contact. At the onset of slider/disk contact, one or more flexure modes of vibration increase sharply. The natural vibrations of a flexure occur over a relatively wide frequency bandwidth, which makes it difficult to isolate expected vibrations using bandpass filters. However, the close correlation between flexure modes of vibration and slider/disk contact make flexure vibration modes highly desirable as a basis for determination of slider/disk contact.

Thus, the spectrum analyzer 500 is coupled to the FM demodulator 440 to receive the FM demodulated read back signals, one at a time, and analyze signal amplitudes for each read back signal, over the frequency range corresponding to the natural vibrations that may occur in a flexure due to slider/disk contact. The natural frequencies of flexure vibrations are determined empirically for the type of flexure used in the disk drive 20, and used to set the frequency range for demodulation and spectrum analysis.

Throughout a frequency spectrum of from, e.g., 10K Hz to 500 k hz, there is a low level noise from the FM demodulator 440. A threshold envelope is set at an amplitude or amplitudes that are sufficiently higher than the average level for the noise amplitude to insure that accurate indications of slider/disk contact are obtained. Whenever slider/disk contact occurs, the amplitude of the various frequencies corresponding to the flexure vibration peak sharply above the threshold. The precise frequencies of vibration varies from drive head to drive head due to manufacturing tolerances and other factors distinctive to a particular head structure. By using a spectrum analysis over a bandwidth that covers the full range of possible flexure vibrations, it is not necessary to know which precise frequencies will correspond to flexure vibration for any particular slider/disk interface.

The spectrum analyzer 500 can comprise a processor performing a fast Fourier transformation of the FM demodulated read back signals. A fast Fourier transformation can be performed at much higher speeds than a conventional spectrum analyzer and the results from one revolution of read back are reliable enough for accurately detecting contact. In addition, the discontinuity can be ignored in the analysis.

Each amplitude detected in the spectrum analysis is compared in the peak detector 560 to the threshold value. As noted above, the threshold value at any particular frequency is set relevant to the level of noise in the FM demodulated signals. The amplitude of noise from a conventional FM demodulator is insignificant compared to the amplitude of noise from mechanical vibrations. A conventional FM demodulator of the type typically used in FM radios provides a detection sensitivity of approximately 0.08 μm/s.

If any signal amplitude of any of the read back signals exceeds the threshold value, this indicates flexure vibrations caused by slider/disk contact. The peak detector 560 is operated to indicate which read back signal or signals had signal amplitudes that exceeded the threshold value so that the particular heads 24a–h failing to begin fly height operation by the desired take off velocity, are identified.

The acoustic sensor, back EMF probe arrangement of the present invention can be implemented at a level of capital expense that is sufficiently economical to allow multiple test stations, each including sensor and probe devices, for a high testing throughput commensurate with production rates of a modern mass production disk drive manufacturing operation. A frequency demodulation test system, as described above, would used to test a relatively few drives, i.e. only those drives that have failed the acoustic emission test. Accordingly, a single frequency demodulation system can be used to service the failed drives from multiple acoustic emission test systems providing an overall test arrangement that accommodates mass production testing of each and every drive during manufacture to identify individual heads that do not meet fly height specifications for the drives.

We claim:

1. A method for testing for slider/disk contact in a disk drive comprising a rotating disk and a head mounted by an actuator for selective positioning of the head over the disk, the head having a slider, and a spindle motor for rotating the disk, comprising the steps of:

providing power to the spindle motor to cause rotation of the disk at a preselected rotational velocity corresponding to a rotational velocity designed for the disk during normal read/write operation;

thereafter withdrawing power from the spindle motor such that the disk spins down to zero rotational velocity;

while the disk spins down to zero rotational velocity, forming an acoustic coupling between an acoustic emission sensor having an electric output and the spindle motor to provide first electric signals representative of acoustic emissions from the spindle motor, including acoustic emissions caused by slider/disk contact;

while the disk spins down to zero rotational velocity, coupling an electric probe to the spindle motor to provide second electric signals representative of back EMF generated by the spindle motor as the disk spins down to zero velocity;

monitoring the first electric signals for a first indication of slider/disk contact; and utilizing the second signals at the time of the first indication of slider/disk contact from the first electric signals, to calculate the rotational velocity of the disk at the time of the first indication of slider/disk contact.

2. The method of claim 1, comprising the further step of comparing the calculated rotational velocity to a threshold value relevant to a desired take-off or landing velocity for the head of the disk drive, and indicating when the calculated rotational velocity exceeds the threshold value.

3. A method for testing for slider/disk contact in a disk drive comprising a rotating disk and a head mounted by an actuator for selective positioning of the head over the disk, the head having a slider, and a spindle motor for rotating the disk, comprising the steps of:

providing power to the spindle motor to cause rotation of the disk at a preselected rotational velocity corresponding to a rotational velocity designed for the disk during normal read/write operation;

thereafter withdrawing power from the spindle motor such that the disk spins down to zero rotational velocity;

while the disk spins down to zero rotational velocity, forming an acoustic coupling between an acoustic emission sensor having an electric output and the spindle motor to provide first electric signals representative of acoustic emissions from the spindle motor, including acoustic emissions caused by slider/disk contact;

while the disk spins down to zero rotational velocity, monitoring the rotational velocity of the disk;

monitoring the first electric signals for a first indication of slider/disk contact; and indicating the rotational velocity of the disk at the time of the first indication of slider/disk contact.

4. The method of claim 3, comprising the further step of comparing the indicated rotational velocity to a threshold value relevant to a desired take-off or landing velocity for the head of the disk drive, and further indicating when the indicated rotational velocity exceeds the threshold value.

5. A method for testing for slider/disk contact in a disk drive comprising a plurality of rotating disks and at least two heads, each mounted via a flexure to an actuator for selective positioning of the head over a respective one of the disks, each head having a slider, and a spindle motor for rotating the disk, comprising the steps of:

providing power to the spindle motor to cause rotation of the disks at a preselected rotational velocity corresponding to a rotational velocity designed for the disks during normal read/write-operation;

thereafter withdrawing power from the spindle motor such that the disks spin down to zero rotational velocity;

while the disks spin down to zero rotational velocity, forming an acoustic coupling between an acoustic emission sensor having an electric output and the spindle motor to provide first electric signals representative of acoustic emissions from the spindle motor, including acoustic emissions caused by slider/disk contact;

while the disks spin down to zero rotational velocity, monitoring the rotational velocity of the disks;

monitoring the first electric signals for a first indication of slider/disk contact; and indicating the rotational velocity of the disks at the time of the first indication of slider/disk contact;

comparing the indicated rotational velocity to a threshold value relevant to a desired take-off or landing velocity for the heads of the disk drive;

when the indicated rotational velocity exceeds the threshold value using a first one of the heads of the disk drive to write a signal having a substantially uniform pattern on the respective disk as the disk rotates at a first preselected rotational velocity;

thereafter rotating the disk at a second preselected rotational velocity;

while rotating at the second preselected rotational velocity, using the first one of the heads to read back the signal written at the first preselected rotational velocity; and performing an FM demodulation of the read back signal through a frequency range corresponding to a range of natural frequencies of vibration of the flexure caused by slider/disk contact;

wherein one of the first and second rotational velocities is set to be approximately equal to a desired or landing take off velocity of the head, such that the FM demodulation of the read back signal indicates whether slider/disk contact for the first one of the heads exists at the take off velocity.

6. The method of claim 5 comprising the further steps of:

providing a spectrum analyzer; and using the spectrum analyzer to perform a spectrum analysis of the FM demodulation to determine amplitudes of frequency components of the demodulated read back signal caused by slider/disk contact.

7. The method of claim 6 comprising the further steps of:

providing a peak detector arranged to receive the amplitudes; and operating the peak detector to compare the amplitudes to a threshold value and to indicate rejection of the disk drive when any amplitude exceeds the threshold value.

8. The method of claim 5 comprising the further steps of:

when the indicated rotational velocity exceeds the threshold value using a second one of the heads of the disk drive to write a signal having a substantially uniform pattern on the respective disk as the disk rotates at a first preselected rotational velocity;

thereafter rotating the disk at a second preselected rotational velocity;

while rotating at the second preselected rotational velocity, using the second one of the heads to read back the signal written at the first preselected rotational velocity; and performing an FM demodulation of the read back signal through a frequency range corresponding to a range of natural frequencies of vibration of the flexure caused by slider/disk contact;

wherein one of the first and second rotational velocities is set to be approximately equal to a desired or landing take off velocity of the head, such that the FM demodulation of the read back signal indicates whether slider/disk contact for the second one of the heads exists at the take off velocity.

9. A method for testing for slider/disk contact in a disk drive comprising a plurality of rotating disks and at least two heads, each mounted by an actuator for selective positioning of the head over a respective one of the disks, each head having a slider, and a spindle motor for rotating the disk, comprising the steps of:

providing power to the spindle motor to cause rotation of the disks at a preselected rotational velocity corresponding to a rotational velocity designed for the disks during normal read/write operation;

thereafter withdrawing power from the spindle motor such that the disks spin down to zero rotational velocity;

while the disks spin down to zero rotational velocity, forming an acoustic coupling between an acoustic emission sensor having an electric output and the spindle motor to provide first electric signals representative of acoustic emissions from the spindle motor, including acoustic emissions caused by slider/disk contact;

while the disks spin down to zero rotational velocity, monitoring the rotational velocity of the disk;

monitoring the first electric signals for a first indication of slider/disk contact; and indicating the rotational velocity of the disks at the time of the first indication of slider/disk contact;

comparing the indicated rotational velocity to a threshold value relevant to a desired take-off or landing velocity for the heads of the disk drive;

when the indicated rotational velocity exceeds the threshold value:

rotating the disks of the disk drive at a first preselected rotational velocity;

using one of the heads of the disk drive to write a signal having a substantially uniform pattern on the respective disk as it rotates at the first preselected rotational velocity;

thereafter rotating the disk at a second preselected rotational velocity;

while rotating at the second preselected rotational velocity, using the one of the heads to read back the signal written at the first preselected rotational velocity;

performing an FM demodulation of the read back signal through a frequency range corresponding to a range of natural frequencies of vibration caused by slider/disk contact; and performing a spectrum analysis of the FM demodulation to determine amplitudes of frequency components of the demodulated read back signal caused by slider/disk contact to determine the take-off velocity of the one of the heads.

10. A method for testing for slider/disk contact in a disk drive comprising a rotating disk and a head mounted by an actuator for selective positioning of the head over the disk, the head having a slider, and a spindle motor for rotating the disk, comprising the steps of:

providing power to the spindle motor to cause rotation of the disk at a preselected rotational velocity corresponding to a rotational velocity designed for the disk during normal read/write operation;

thereafter withdrawing power from the spindle motor such that the disk spins down to zero rotational velocity;

while the disk spins down to zero rotational velocity, using a fluid layer to form an acoustic coupling between an acoustic emission sensor having an electric output and the spindle motor to provide first electric signals representative of acoustic emissions from the spindle motor, including acoustic emissions caused by slider/disk contact;

while the disk spins down to zero rotational velocity, monitoring the rotational velocity of the disk;

monitoring the first electric signals for a first indication of slider/disk contact; and indicating the rotational velocity of the disk at the time of the first indication of slider/disk contact.

11. The method of claim 10 wherein the fluid comprises alcohol.

12. A method for testing for slider/disk contact in a disk drive comprising at least one rotating disk and at least two heads, each mounted by an actuator for selective positioning of the head over a respective one of the at least one rotating disk, each head having a slider, and a spindle motor for rotating the at least one rotating disk, comprising the steps of:

providing power to the spindle motor to cause rotation of the one at least one disk at a preselected rotational velocity corresponding to a rotational velocity designed for the at least one rotating disk during normal read/write operation; thereafter withdrawing power from the spindle motor such that the at least one rotating disk spins down to zero rotational velocity;

while the at least one rotating disk spins down to zero rotational velocity, forming an acoustic coupling between an acoustic emission sensor having an electric output and the spindle motor to provide first electric signals representative of acoustic emissions from the spindle motor, including acoustic emissions caused by slider/disk contact;

while the at least one rotating disk spins down to zero rotational velocity, monitoring the rotational velocity of the at least one rotating disk;

monitoring the first electric signals for a first indication of slider/disk contact; and indicating the rotational velocity of the at least one rotating disk at the time of the first indication of slider/disk contact;

comparing the indicated rotational velocity to a threshold value relevant to a desired take-off or landing velocity for the heads of the disk drive;

when the indicated rotational velocity exceeds the threshold value:

rotating the at least one disk of the disk drive at a first preselected rotational velocity;

using one of the heads of the disk drive to write a signal having a substantially uniform pattern on the respective disk as it rotates at the first preselected rotational velocity;

thereafter rotating the disk at a second preselected rotational velocity;

while rotating at the second preselected rotational velocity, using the one of the heads to read back the signal written at the first preselected rotational velocity;

performing an FM demodulation of the read back signal through a frequency range corresponding to a range of natural frequencies of vibration caused by slider/disk contact; and performing a spectrum analysis of the FM demodulation to determine amplitudes of frequency components of the demodulated read back signal caused by slider/disk contact to determine the take-off velocity of the one of the heads.

* * * * *